2,721,210

PRODUCTION OF ALLYLIC SULFONIC ACIDS

Robert L. Foster, Park Forest, Ill., assignor to Sinclair Refining Company, New York, N. Y., a corporation of Maine No Drawing. Application June 3, 1954,
Serial No. 434,310

2 Claims. (Cl. 260—513)

This invention relates to allylic sulfonic acids and, more particularly, relates to the preparation and recovery of allylic sulfonic acids of aliphatic unsaturated hydrocarbons containing six to ten carbon atoms per molecule. The invention is specifically concerned with the allylic sulfonic acids of $C_3$ to $C_4$ olefins, particularly of diisobutylene and tripropylene.

Sulfonic acids of saturated and unsaturated hydrocarbons have numerous applications in the chemical field, being employed as wetting agents, dispersing agents, emulsifying agents, frothing agents, etc. Various derivatives of these sulfonic acids, such as the sulfonyl halides, esters and amides are useful as chemical intermediates, solvents, softening agents, plasticizers, etc.

One route which could be employed to produce sulfonic acids from hydrocarbons is based on work by Strecker (see Ann. 148 90, 1868) and involves the reaction of organic halides with a sulfite, usually sodium sulfite, to yield the corresponding sulfonates. The sulfite is normally employed as an aqueous solution; accordingly, the main side reaction involves the hydrolysis of the halide to an alcohol and suppression of this side reaction is necessary to enhance the yields obtained. A variation of the Strecker reaction employs allylic halides as the organic base material. Allylic halides have rapid hydrolysis rates under certain conditions; hence, a Strecker-type reaction employing allylic halides might be expected to result in a lower yield than with the corresponding saturated halide. Actual experiments have shown the feasibility of employing allylic halides notwithstanding the high rate of hydrolysis.

The salts obtained in a Strecker-type reaction can be converted to acids by the reaction (1) $RSO_3Na + HCl \rightleftharpoons RSO_3H + NaCl$ where R is an aliphatic hydrocarbon. Sulfonic acids are strong acids and attempts to liberate these acids from their salts are limited by the equilibrium, shown in (1) above, favoring the sulfonate.

In the course of a study of various processes for the production of sulfonic acids of $C_6$ to $C_{10}$ hydrocarbons it was determined that acceptable yields of the sulfonate intermediate could be obtained when employing allylic halides in a Strecker type reaction. With the solution of this problem the utilization of common petroleum products such as diisobutylene and tripropylene for the production of unsaturated sulfonic acids became a possibility if a method could be devised which permitted reasonable yields of the acids from the sulfonate. The solution to the problem presented by the equilibrium reaction required a method which would upset the equilibrium to favor the formation of the acid when common and inexpensive reactants were employed and, at the same time, avoid the introduction of any new complication due to the nature of the means employed to upset the equilibrium. A problem involving separation of the acid from the reaction mixture could be less desirable than a yield equivalent to equilibrium conditions.

A process which upsets the equilibrium shown in (1) above in favor of the acid product, thereby facilitating the production of high yields of sulfonic acids, has now been discovered. In accordance with my invention, high yields of sulfonic acids are obtained in the reaction of substantially anhydrous hydrogen chloride and the salts of sulfonic acids by employing as the predominating component of the reaction medium a $C_5$ to $C_8$ saturated aliphatic hydrocarbon; these hydrocarbons are capable of acting as a solvent for the sulfonic acid under the circumstances of the reaction and do not act as a solvent for the salt produced. The preferred reaction medium is hexane.

Sulfonates suitable for use in my invention can be obtained by any known process. A preferred method for the production of sulfonates utilizes an allylic chloride, a 25 to 30% aqueous sodium sulfite solution, a temperature of about 95° C., and employs reflux operation. At the end of the reaction time, unreacted chloride and by-product alcohol can be removed by steam distillation and the sulfonate product can be crystallized from the distilland while cooling to room temperature. Yields of 60–65% of crude product are common.

Two specific acids produced in accordance with my invention are diisobutylene sulfonic acid and tripropylene sulfonic acid. These acids can be produced by suspending their salts, preferably the sodium salts, in a $C_5$ to $C_8$ saturated hydrocarbon such as hexane or a mixture of such hydrocarbons and ethyl ether and then bubbling anhydrous chloride into the suspension. At the end of the reaction the mixture is filtered to remove NaCl, and the acid product can be recovered from the filtrate by evaporation of a small amount of solvent from said filtrate. Subjecting the filtrate to reduced pressure is the preferred and a highly effective means for concentration. The precipitate which forms is collected as product. When unreacted sulfonate is obtained with the acid, separation can be effected by dissolving the acid in hot chloroform, filtering out the insoluble sulfonate and recrystallizing the acid from about a 4:1 mixture of hexane and chloroform. The acids are soluble in ether and benzene and can be recrystallized from mixtures of these solvents with hexane.

Allylic sulfonic acids of aliphatic unsaturated $C_6$ to $C_{10}$ hydrocarbons are not soluble in $C_5$ to $C_8$ saturated aliphatic hydrocarbons, such as hexane, and advantage is taken of this fact to recover the acid as is pointed out above. On the other hand, the acid formed as the reaction proceeds generally does not precipitate even under the circumstances most favorable to precipitation, i. e., substantial completion of the reaction. This phenomenon is attributed to the effect of dissolved hydrogen chloride, though it should be understood that I do not intend to be bound by theory.

The invention will be described further by means of specific examples. The invention is not to be limited by the details of the procedure described.

Example I

Twenty grams of sodium diisobutylene sulfonate were suspended in one liter of hexane contained in a flask adapted for stirring. The mixture was stirred for about one hour at room temperature while anhydrous HCl was bubbled through. At the end of the hour, stirring was stopped and the solution filtered. The filtrate was concentrated to 750 ml. under reduced pressure at room temperature and light tan crystals precipitated. A further concentration to 650 ml. precipitated other light tan crystals and a concentration to 550 ml. precipitated additional product. Concentration to 100 ml. and cooling in a refrigerator gave no further precipitate. The combined precipitates were analyzed and showed a 55.5% yield of acid and a recovery of 34.1% of unconverted sodium sulfonate. The amount of sodium chloride recovered indicated a 56.5% conversion of sulfonate. This run was identified as number 578–18.

By conventional tests including an elemental analysis, acid number determination and infrared spectrum analysis, the product of Example I was determined to be the dihydrate form of the acid. Analysis is as follows:

Table
ACID ANALYSIS ($C_8H_{16}SO_3 \cdot 2H_2O$)

|  | Found | Calculated |
| --- | --- | --- |
| Percent C | 41.78 | 42.08 |
| Percent H | 8.66 | 8.83 |
| Percent S | 14.6 | 14.04 |
| Percent Na | 0.157 | 0.00 |
| Acid No | 243.7 | 246 |

EXAMPLE II

A second run substantially identical with Example I was conducted resulting in a yeld of 75.2% of the diisobutylene sulfonic acid and a 14.35% recovery of unconverted sodium diisobutylene sulfonate. The amount of sodium chloride recovered indicated a 72.7% conversion of sulfonate. This run was identified as number 578–19.

EXAMPLE III

A run was made using the procedural steps of Example I and employing 85 grams of sodium diisobutylene sulfonate in a liter of hexane. In this experiment a portion of the acid precipitated with the sodium chloride. The mixture of sodium chloride, unreacted sodium diisobutylene sulfonate and diisobutylene sulfonic acid was separated by dissolving out the acid with hot chloroform and filtering, removing the sulfonate from the residue by dissolving in hot ethanol and leaving the sodium chloride behind. A total yield of 66.5% was obtained. The amount of sodium chloride recovered indicated an 80 per cent conversion of the sulfonate. This run was identified as number 578–22.

EXAMPLE IV

A run was made using the procedural steps of Example I and employing 60 grams of sodium diisobutylene sulfonate suspended in a liter of reaction medium containing 900 ml. of hexane and 100 ml. of diethyl ether. Conversion based on the sodium chloride formed was 90.2%. The yield of diisobutylene sulfonic acid obtained was 84.7%. This run was identified as 578–25.

The examples given above are representative of the effectiveness of my invention as a method for producing sulfonic acids of aliphatic unsaturated hydrocarbons containing from six to ten carbon atoms per molecule. The simplicity of recovering the acid in high yields under the adverse circumstance of being precipitated with salt produced in the reaction and unconverted sulfonate is shown in Example III.

Each of the runs identified as Examples I to IV above was conducted at atmospheric pressure and ambient temperature.

I claim:

1. The method of producing allylic sulfonic acids of aliphatic unsaturated $C_6$ to $C_{10}$ hydrocarbons comprising contacting with anhydrous hydrogen chloride a sodium sulfonate of said hydrocarbon suspended in a reaction medium consisting essentially of a saturated $C_5$ to $C_8$ aliphatic hydrocarbon.

2. The method of producing diisobutylene sulfonic acid which comprises contacting with anhydrous hydrogen chloride, a suspension of sodium diisobutylene sulfonate in a reaction medium consisting essentially of hexane.

References Cited in the file of this patent
UNITED STATES PATENTS

| 2,278,064 | Simo et al. | Mar. 31, 1942 |
| 2,318,036 | Werntz | May 4, 1943 |
| 2,365,783 | Suter | Dec. 26, 1944 |
| 2,600,415 | Mikeska | June 17, 1952 |